United States Patent
Lang

(10) Patent No.: US 10,588,268 B2
(45) Date of Patent: Mar. 17, 2020

(54) BALER WITH WEAR REDUCING CONTROLLER

(71) Applicant: Deere & Company, Moline, IL (US)

(72) Inventor: Eric R. Lang, Newhall, IA (US)

(73) Assignee: DEERE & COMPANY, Moline, IL (US)

(*) Notice: Subject to any disclaimer, the term of this patent is extended or adjusted under 35 U.S.C. 154(b) by 566 days.

(21) Appl. No.: 15/195,497

(22) Filed: Jun. 28, 2016

(65) Prior Publication Data

US 2017/0367268 A1 Dec. 28, 2017

(51) Int. Cl.
*A01F 15/08* (2006.01)
*A01F 15/04* (2006.01)

(52) U.S. Cl.
CPC ........ *A01F 15/0841* (2013.01); *A01F 15/042* (2013.01); *A01F 15/0825* (2013.01)

(58) Field of Classification Search
CPC ......... B30B 13/00; B30B 9/30; B30B 9/3007; B30B 15/14; B30B 15/18; B30B 15/26; B30B 15/28; B30B 13/30; B30B 13/3007; B30B 13/14; B30B 13/18; B30B 13/26; B30B 13/28; A01F 15/0825; A01F 15/0841; A01F 15/04; A01F 15/15042
USPC .............................. 100/179, 35, 50, 240, 245
See application file for complete search history.

(56) References Cited

U.S. PATENT DOCUMENTS

| | | | |
|---|---|---|---|
| 4,624,180 A * | 11/1986 | Strosser | A01F 15/0825 100/41 |
| 5,173,866 A * | 12/1992 | Neumann | B30B 9/3007 100/229 A |
| 6,542,853 B1 | 4/2003 | Murakami et al. | |
| 9,119,347 B2 | 9/2015 | Bonte et al. | |
| 2006/0048481 A1* | 3/2006 | Hood | A01F 15/0715 53/399 |
| 2006/0243055 A1 | 11/2006 | Sundermeyer et al. | |
| 2014/0202343 A1 | 7/2014 | Van Amstel et al. | |
| 2016/0037706 A1* | 2/2016 | Bebernes | A01B 69/007 180/403 |

FOREIGN PATENT DOCUMENTS

| | | |
|---|---|---|
| CZ | 303481 | 10/2012 |
| DE | 19640061 | 4/1998 |

OTHER PUBLICATIONS

European Patent Office Action for Application No. 17174324.8 dated Aug. 1, 2018 (4 pages).

* cited by examiner

*Primary Examiner* — Adam J Eiseman
*Assistant Examiner* — Mohammed S. Alawadi
(74) *Attorney, Agent, or Firm* — Michael Best & Friedrich LLP

(57) ABSTRACT

A baler having a compression system for forming a bale includes a plunger that reciprocates within a baling chamber between an extended position and a retracted position. The baler also includes a controller configured to detect and calculate the amount of work exerted by the plunger as it reciprocates within the baling chamber. The controller generally calculates the work exerted by the plunger by determining the force applied to the plunger and the distance the plunger has traveled with respect to the baling chamber.

19 Claims, 4 Drawing Sheets

BALER WITH WEAR REDUCING CONTROLLER

BACKGROUND

The present disclosure relates to an agricultural baler having a compression system for forming bales of crop.

During use, agricultural balers are subject to large internal pressures and forces during the baling process. The components of the compression assembly, such as the plunger, gearbox, and linkage, which produce these forces, tolerate repeated impacts from bale contact that can cause increasing wear and a reduction in useful life.

SUMMARY

In one aspect, the disclosure provides a method for reducing wear on a baler, the baler including a baling chamber, a plunger movable with respect to the baling chamber, a first sensor operable to measure force applied to the plunger, a second sensor operable to measure the position of the plunger with respect to the baling chamber, and a controller in operable communication with the first sensor, the second sensor, and the plunger. Where the method includes calculating the force applied to the plunger over a predetermined period of time based at least in part on readings from the first sensor, calculating the distance the plunger has moved with respect to the baling chamber over the same predetermined period of time based at least in part on readings from the second sensor, calculating the work exerted by the plunger based at least in part on the force applied to the plunger and the distance the plunger has moved with respect to the baling chamber, and comparing the work calculation with one or more pre-calculated parameters.

In another aspect, the disclosure provides a baler including a baling chamber, a plunger movable with respect to the baling chamber, a bale case, a forming bale positioned within the baling chamber, a first sensor operable to measure the force applied to the plunger, a second sensor operable to measure movement of the forming bale with respect to the bale case, and a controller in operable communication with the first sensor, the second sensor, and the plunger. The controller configured to calculate the force applied to the plunger over a predetermined period of time based at least in part on readings from the first sensor, calculate the distance the forming bale has moved with respect to the baling case over the same predetermined period of time based at least in part on readings from the second sensor, calculate the work exerted by the plunger at least partially based on the force applied to the plunger and the distance the forming bale has moved with respect to the baling case, and compare the work calculation with one or more pre-calculated parameters.

In yet another aspect, the disclosure provides a baler for baling crop material, the baler including a frame, one or more wheels rotatably coupled to the frame, a feed assembly configured to collect crop material from a support surface, a baling chamber configured to receive crop material from the feed assembly, a plunger at least partially positioned within the baling chamber, where the plunger is operable to reciprocate between a retracted and extended position, and a controller in operable communication with the feed assembly, the baling chamber, and the plunger, where the controller is configured to calculate the work exerted by the plunger based at least in part on the change in position of the plunger within the baling chamber, and the force applied to the plunger.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure relates to a baler, and more particularly to a controller configured to monitor and record the amount of "work" exerted by the baler during a baling operation and to utilize the collected data to adjust the parameters of the baling process (the baling parameters) to minimize wear on the baler and prolong the life of its components. In particular, the controller attempts to minimize the wear on high-stress components such as the gearbox, the linkage, and the plunger of the compression assembly (further described below). Furthermore, the controller has the ability, by utilizing the work calculations, to map long-term wear characteristics of the components as well as detect potentially damaging short-term conditions.

Figure 1:
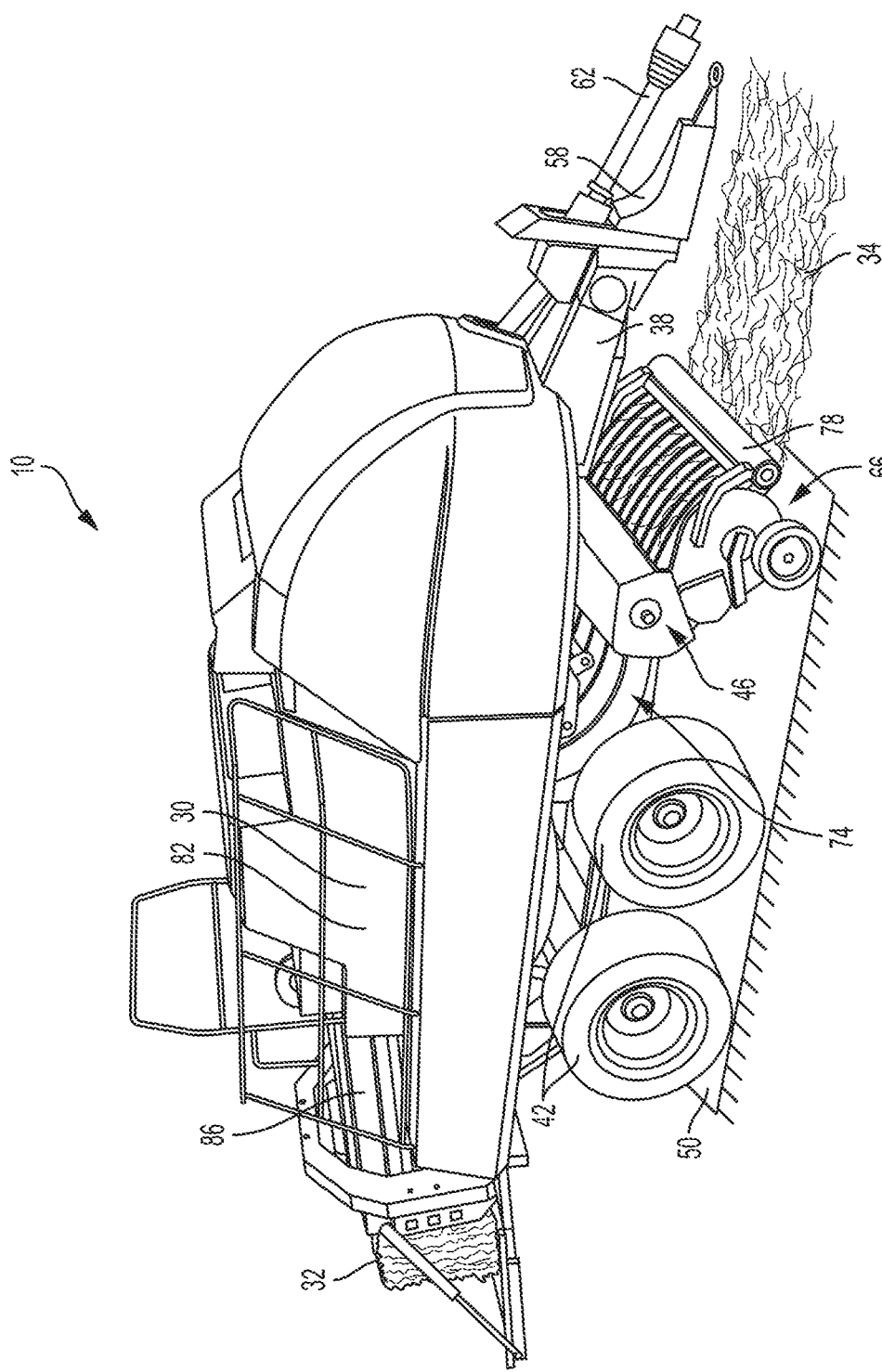
FIG. 1 is a perspective view of a machine, such as a baler, having a controller in accordance with one implementation of the present disclosure.

Referring to FIG. 1, a baler 10 includes a frame 38, a set of wheels 42 mounted on the frame 38, a feed system 46 coupled to the frame 38, a compression system having a compression assembly 30 to receive and compress crop material 34 provided by the feed system 46, and a controller 14 (FIG. 3) to monitor and direct the baling operation. In the illustrated implementation, the baler 10 is a square baler for creating bales 32 of a crop, such as hay, straw, or other biomasses. In other implementations, the disclosure may relate to other types of machines, e.g., vehicles, tractors, harvesters, other types of agricultural machines, forestry machines, mining machines, implementation machines, machines for manufacturing, etc.

In the illustrated embodiment, the frame 38 of the baler 10 includes a tow bar 58 extending from the frame 38 and connectable to a towing vehicle (not shown), such as an agricultural tractor or other driven vehicle. The baler 10 also includes a power takeoff shaft 62 connectable to the towing vehicle to transmit a rotating drive force from the towing vehicle to various components of the baler 10. In other implementations, the baler 10 may have a dedicated power supply and/or prime mover (not shown), such as an engine, motor, battery, fuel cell, etc., for driving the wheels 42 and for driving and/or powering the various components of the baler 10.

As shown in FIG. 1, the baler 10 includes a feed system 46 for picking up crop material 34 from the support surface 50 and conveying it to a compression assembly 30. In the illustrated implementation, the feed system 46 includes a pickup assembly 66 for receiving the crop material 34 from the support surface 50, and a delivery assembly 74 for directing the collected crop material 34 to the compression assembly 30. The pickup assembly 66 includes a roller baffle 78 oriented generally perpendicular to the direction of travel for picking up the crop material 34 and placing it in the baler 10.

The delivery assembly 74 of the feed system 46 directs the crop material 34 collected by the pickup assembly 66 to the compression assembly 30 of the baler 10. In particular, the delivery assembly 74 is configured to direct a metered amount of crop material 34 into the baling chamber 82 during every stroke of the plunger (described below). In the illustrated implementation, the delivery assembly 74 is adjustable, permitting different amounts of crop material 34 to be fed into the compression assembly 30 during each stroke (i.e., the "feed rate"). In particular, the feed system 46 is configured to receive one or more signals from the controller 14 causing it to increase or decrease the amount of crop material 34 delivered to the compression assembly 30 on a particular stroke.

Figure 2A:
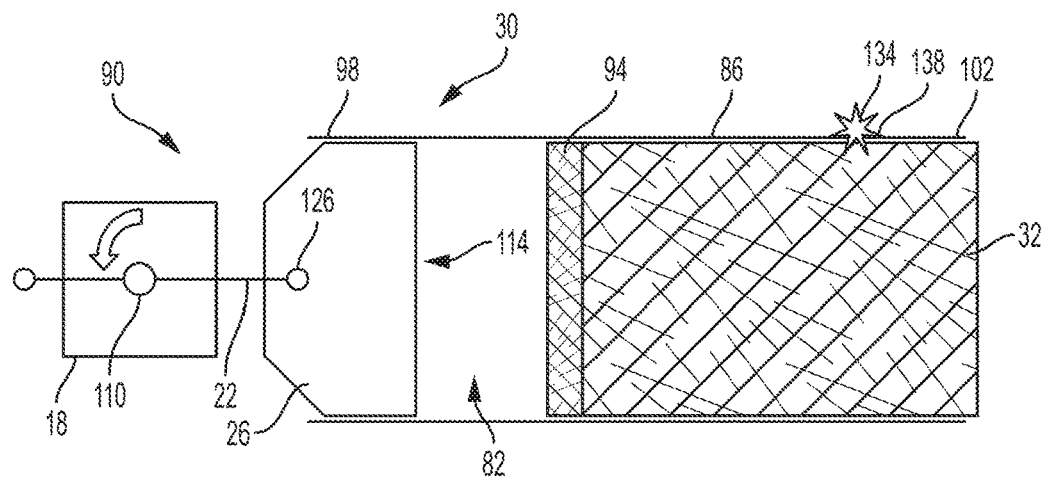
FIGS. 2a-2c are schematic views of the compression assembly of the baler of FIG. 1 illustrating the plunger in various positions of operation.
Figure 2B:
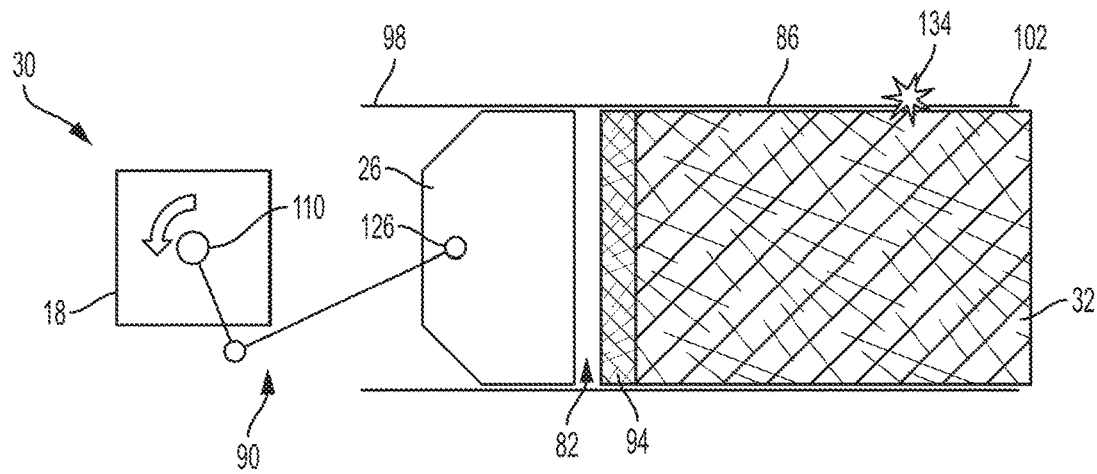
Figure 2C:
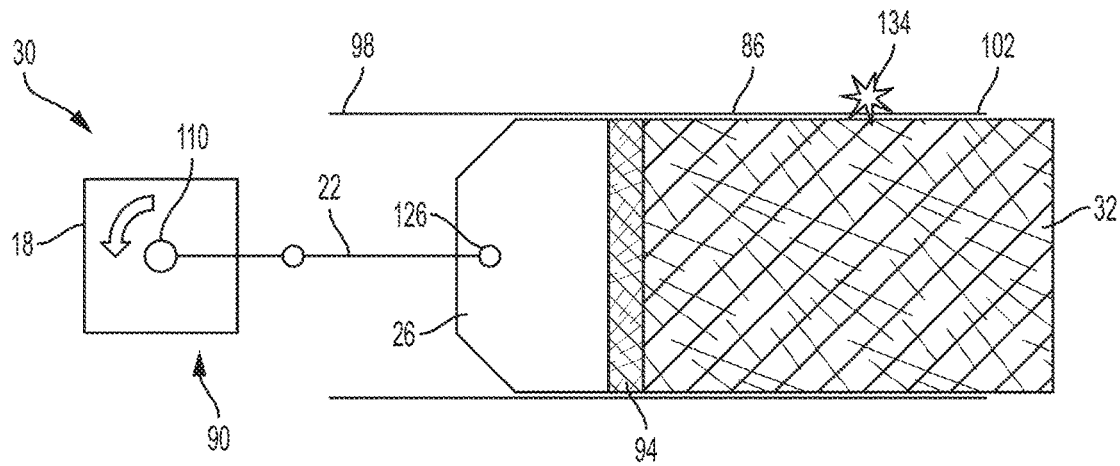
Figure 3:
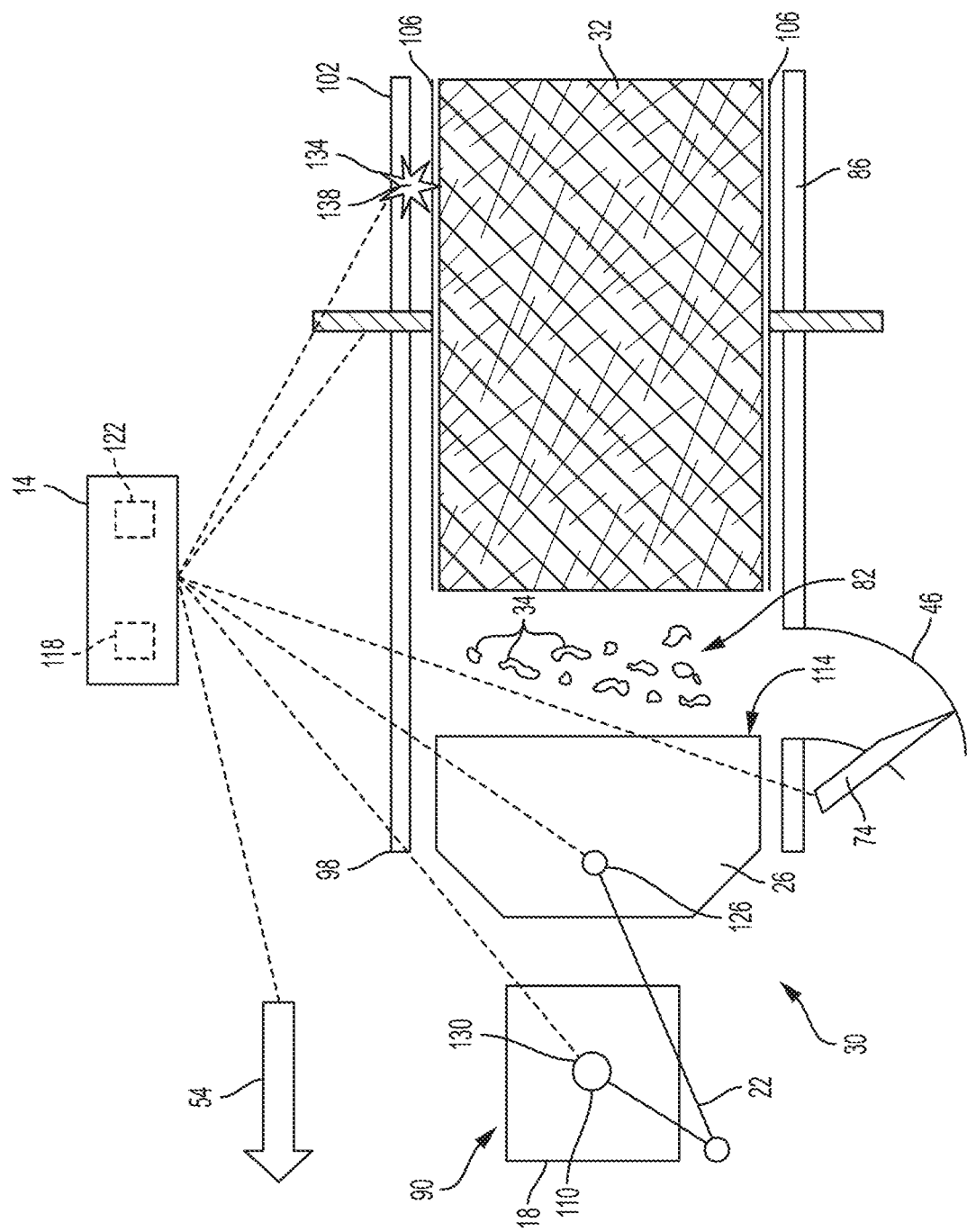
FIG. 3 is a schematic view of the baler of FIG. 1 illustrating the compression assembly, the pickup assembly, and the controller.

Illustrated in FIGS. 2a-3, the compression assembly 30 of the baler 10 includes a baling chamber 82 in communication with the feed system 46, a bale case 86 at least partially defining the baling chamber 82, and a plunger assembly 90 positioned at least partially within the baling chamber 82. A metered amount of crop material 34, known as a flake, is positioned within the baling chamber 82 by the feed system 46 whereby the plunger assembly 90 compresses the crop material 34 against already compacted crop material positioned in the bale case 86, hereinafter referred to as the forming bale 94. The plunger assembly 90 then retracts back to its starting position (FIG. 2a) where another metered amount of crop material 34 is positioned within the baling chamber 82 by the feed system 46 and the stroke begins again. With each passing stroke, the compression assembly 30 compresses the newly introduced crop material 34 against the face of the forming bale 94, causing the forming bale 94 to grow into a densely packed cuboid shape within the bale case 86. Once the forming bale 94 achieves the desired size and density, it is bound (e.g., by wire) to form a completed bale 32. The freshly created bale 32 subsequently becomes a support surface against which the next forming bale may begin to emerge and the process is repeated. Once a bale 32 is completely formed, the bale 32 is ejected from the rear of the baler 10 for subsequent collection.

Illustrated in FIGS. 2a-3, the bale case 86 is substantially rectangular in shape having a first open end 98 to receive the plunger 26 therein, and a second open end 102, opposite the first open end 98 positioned proximate the rear of the baler 10. During use, the bale case 86 acts as a container, holding the forming bale 94 and one or more completed bales 32 against which the compression assembly 30 compresses the newly introduced crop material 34 from the feed system 46. While doing so, the bale case 86 applies a resistive force against the forming bale 94 and any completed bales 32 to resist motion within the bale case 86 toward the second end 102. In particular, it is this resistive force that permits the compressive force of the compression assembly 30 to compact the crop material 34 within the baling chamber 82.

Illustrated in FIG. 3, the walls 106 of the bale case 86 are adjustable with respect to one another to vary the amount of resistive force applied to the forming bale 94 and completed bales 32. Specifically, the walls 106 of the bale case 86 may move inwardly to apply more pressure to the outside of the forming bale 94 or completed bale 32 and therefore create a greater resistive force. In contrast, the walls 106 of the bale case 86 may move outwardly, away from one another, to reduce the pressure on the outside of the forming bale 94 or completed bale 32 and therefore create less resistive force. Generally speaking, the greater the resistive force applied to the forming bale 94 and completed bales 32, the greater the amount of compression that occurs with each stroke of the compression assembly 30 and the denser the resulting bale 32.

Referring again to FIGS. 2a-3, the plunger assembly 90 of the compression system 30 includes a gearbox 18 with an output shaft 110, a plunger 26 movable with respect to the baling chamber 82, and linkage 22 extending between and connecting both the output shaft 110 of the gearbox 18 and the plunger 26. In the illustrated embodiment, the gearbox 18 of the plunger assembly 90 receives input from the power takeoff shaft 62, which in turn is driven by an exterior source, such as a tractor and the like (not shown). In alternative implementations, the gearbox 18 may be driven by a stand-alone power system, such as an internal combustion engine. The gearbox 18 typically includes a number of gear sets (not shown) to transmit the torque provided by the power takeoff shaft 62 to the output shaft 110. In some implementations, the gearbox 18 may have multiple, interchangeable gear sets to permit the gearbox 18 to be set according to changing operating conditions. During use, rotation of the output shaft 110 causes the plunger 26 to reciprocate between extended and retracted positions.

The linkage 22 of the plunger assembly 90 generally converts the rotational motion of the output shaft 110 into linear, reciprocating motion of the plunger 26. In the illustrated implementation, the linkage 22 includes a connecting rod extending between and rotationally coupled to both the output shaft 110 and the plunger 26.

The plunger 26 of the plunger assembly 90 is positioned within and movable with respect to the baling chamber 82 between the retracted position, FIG. 2a, positioned proximate the first end open end 98 of the bale case 86, and the extended or compression position, FIG. 2c, where the plunger 26 is positioned away from the first end 98 of the bale case 86. During use, the plunger 26 is configured to compress crop material 34 located within the baling chamber 82 and positioned between the plunger compression surface 114 and the forming bale 94. In particular, the plunger 26 begins its stroke from the retracted position, with a metered amount of crop material 34 or flake positioned within the baling chamber 82 between the plunger 26 and the forming bale 94. In instances where a previous bale 32 has just been formed, and no forming bale 94 has yet been started, the flake of crop material 34 may be positioned between the plunger 26 and the previous completed bale 32. The plunger 26 then begins moving toward the compression position, capturing the newly inserted crop material 34 between itself (i.e., the compression surface 114) and the forming bale 94. The plunger 26 continues to move toward the compression position, thereby compressing the crop material 34 into the forming bale 94. After reaching the compression position (FIG. 2c), the plunger 26 begins returning back to the retracted position, disengaging from the forming bale 94. Once the plunger has returned to its initial retracted position, the feed system 46 may position a second metered amount of crop material 34 within the baling chamber 82 and the stroke begins anew.

During the baling process, the compression assembly 30 undergoes large amounts of stress, causing wear on the components. The wear experienced by the components of the compression assembly 30 generally develops in two forms: long-term wear consisting of relatively smaller forces occurring over a large number of strokes/cycles, and short-term "overload" wear occurring during high energy impacts, typically in excess of that expected during normal operation. Both types of wear may be correlated to the amount of "work" the components have exerted during the baling process. As such, by calculating and recording the amount of work the compression assembly 30 has exerted, it is possible to track the amount of wear the components have undergone during their operational life. Furthermore, with the calculation occurring in real-time or near real-time, overload or other potentially damaging conditions can be avoided or stopped before progressing too far.

Illustrated in FIG. 3, the controller 14 of the baler 10 includes a processor 118, a memory unit 122 in operable communication with the processor 118, and one or more sensors 126, 130, and 134 sending and receiving signals from the processor 118. The processor 118 may also be in operable communication with one or more elements of the baler 10 including, but not limited to, the feed system 46 and the compression assembly 30. The processor 118 may also be in operable communication with the towing vehicle (not shown), or be able to control the travel speed 54 of the baler 10. During use, the processor 118 receives signals from the one or more of the sensors 126, 130, 134 and uses that information to calculate the amount of "work" exerted by the baler 10 onto the forming bale 94 or completed bale 32 over a predetermined period of time. After calculating the amount of work exerted during a particular time period, the controller 14 may compare the calculated work-load with one or more pre-set standards. Finally, the controller 14 may output commands to various elements of the baler 10 (e.g., the feed system 46) to adjust the parameters of the baling process so as to minimize the amount of wear or damage imparted onto the baler 10.

The controller 14 includes a plurality of sensors 126, 130, and 134 positioned throughout the baler 10 to provide information regarding the baling process. In particular, the baler 10 includes a plunger force sensor 126, a plunger position sensor 130, and a bale position sensor 134. The sensors 126, 130, 134 may be present individually, in plurality, or in combination.

The plunger force sensor 126 includes a force sensor mounted to the linkage 22 of the plunger 26 and configured to measure the total amount of force being applied to the compression surface 114 as the plunger 26 travels along its stroke path. In alternative implementations, the plunger force sensor 126 may include a plate force sensor (not shown) mounted to the compression surface 114 of the plunger 26 or other force measuring sensors known in the art.

The plunger position sensor 130 determines the relative position of the plunger 26 with respect to the baling chamber 82. The plunger position sensor 130 may include a sensor mounted directly on the plunger 26, a sensor mounted to the baling chamber 82, or a sensor mounted to the output shaft 110 of the gearbox 18. Such sensors may include Hall effect sensors, variable resistance sensors, optical sensors, and the like. In instances where the plunger position sensor is mounted to the output shaft 110 of the gearbox 18, the processor 118 may include calculations able to convert the change in angular position of the output shaft 110 into the linear change in relative position of the plunger 26 with respect to the bailing chamber 82.

The bale position sensor 134 determines the relative position of the bale 32 with respect to the bale case 86. The bale position sensor 134 generally includes a spur wheel 138 in contact with the outer surface of the bale 32 that records movement of the bale 32 with respect to the bale case 86. Specifically, movement of the bale 32 toward the second end 102 of the bale case 86 causes the spur wheel 138 to rotate, and this rotation in turn is recorded and transmitted to the processor 118.

Illustrated in FIG. 3, the processor 118 of the baler 10 calculates the amount of work exerted by the plunger 26 during a single stroke. A stroke, as described above, includes a single reciprocating movement of the plunger 26 during the baling process (i.e., the plunger moving from the retracted position, FIG. 2a, to an extended position, FIG. 2c, and returning back to the initial retracted position, FIG. 2a). In other embodiments, a stroke may be defined rotationally as one or more rotations of the output shaft 110 of the gearbox 18. As the plunger 26 moves along its stroke path, the processor 118 receives a stream of information in the form of signals, from the sensors 126, 130, and 134 positioned throughout the baler 10. In particular, the processor 118 may receive data including, but not limited to, the position of the plunger 26 within the baling chamber 82, the position of the bale 32 within the bale case 86, the force applied to the plunger 26, and the rotational position of the output shaft 110. The processor 118 then compiles the raw information received from the sensors 126, 130, and 134 and processes it using one or more algorithms to calculate the total work exerted by the baler 10 over the duration of the stroke ($W_{stroke}$).

In the present implementation, the work exerted over the stroke or $W_{stroke}$ is calculated as the summation of the work exerted during a number of "cycles" occurring within the stroke ($W_{stroke} = \Sigma W_{Cycle}$). In particular, a "cycle" may include a predetermine time interval ($\Delta t$), generally tied to the amount of time it takes for the processor 118 to receive information from the sensors 126, 130, and 134 (e.g., the refresh rate of the processor 118). During use, the processor 118 receives a stream of information from the one or more sensors 126, 130, and 134 and calculates the amount of work exerted over a predetermined time interval or cycle ($W_{cycle}$). The controller 14 then records each work-cycle calculation in the controller's memory 122. After a given stroke is complete, the controller 14 adds together the work exerted during each cycle occurring during the stroke to deduce the amount of work exerted over the entire stroke. Dependent upon the accuracy required and the available computing power, more or few cycles may occur during a single stroke. In the present embodiment, a cycle duration is approximately 10 μs ($\Delta t = 10$ μs).

Figure 4:
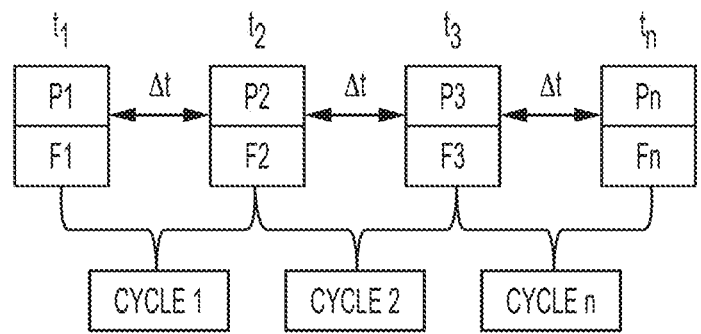
FIG. 4 is a diagram illustrating one algorithm for calculating the work exerted by a plunger during a given cycle.

In the present implementation, the work exerted during each cycle ($W_{cycle}$) is calculated by multiplying the average force applied to the plunger by the forming bale 94 or completed bale 32 ($F_{plunger}$) during the cycle with the distance the plunger 26 traveled with respect to the baling chamber 82 during that same time period ($D_{plunger}$). As illustrated in FIG. 4, the processor 118 receives signals from the sensors at given time intervals ($\Delta t$) indicating, among other things, a plunger position measurement (P) and a plunger force measurement (F). During use, the processor 118 utilizes the series of measurements, one per time interval ($\Delta t$), to calculate the amount of work applied by the plunger during the intervening cycle: $W_{Cycle} = \bar{F}_{plunger} * D_{Plunger}$.

As illustrated in FIG. 4, the processor 118 receives a first set of sensor readings at time $t_1$ including a first plunger force measurement ($F_1$) and a first plunger position measurement ($P_1$). After a first time interval has lapsed, a second set of readings are received by the processor 118 at time $t_2$, including a second plunger force measurement ($F_2$) and a second plunger position measurement ($P_2$). After yet another time interval has lapsed, a third set of readings are received by the processor 118 at time $t_3$, including a third force measurement ($F_3$) and a third plunger position measurement ($P_3$). Based on those results, the processor 118 calculates the work exerted by the plunger during the first time interval as follows:

$$W_{Cycle\ 1} = \left[\frac{F_1 + F_2}{2}\right] * |P_1 - P_2|.$$

Furthermore, the processor 118 calculates the work exerted by the plunger during the second time interval as follows:

$$W_{Cycle\ 2} = \left[\frac{F_2 + F_3}{2}\right] * |P_2 - P_3|.$$

In alternative embodiments, the work exerted in each cycle is calculated by multiplying the average force applied to the plunger by the forming bale 94 or completed bale 32 during the cycle ($\bar{F}_{plunger}$) with the distance the completed bale 32 or forming bale 94 has traveled during that same time period ($D_{bale}$). As illustrated in FIG. 4, the processor 118 receives signals from the sensors 126, 130, and 134 at each time interval ($\Delta t$) indicating, among other things, a bale position measurement (PB) and a plunger force measurement (F). During use, the processor 118 utilizes the series of measurements, one per time interval ($\Delta t$), to calculate the amount of work applied by the plunger during the intervening cycles: $W_{Cycle} = \bar{F}_{plunger} * D_{Bale}$.

For example, the processor 118 receives a first set of sensor readings at time $t_1$ including a first force measurement ($F_1$) and a first bale position measurement ($PB_1$). After the first time interval has lapsed, a second set of readings are received by the processor 118 at time $t_2$, including a second plunger force measurement ($F_2$) and a second bale position measurement ($PB_2$). After yet another time interval has lapsed, a third set of readings are received by the processor 118 at time $t_3$, including a third plunger force measurement ($F_3$) and a third bale position measurement ($PB_3$). Based on those results, the processor 118 calculates the work exerted by the plunger 26 during the first cycle time period as follows:

$$W_{Cycle\ 1} = \left[\frac{F_1 + F_2}{2}\right] * |PB_1 - PB_2|.$$

Furthermore, the processor 118 calculates the work exerted by the plunger 26 during the second cycle time period as follows $$W_{Cycle\ 2} = \left[\frac{F_2 + F_3}{2}\right] * |PB_2 - PB_3|.$$

In addition to the two calculation algorithms described above, other work calculation algorithms may be used to determine the amount of work exerted by the plunger 26 during a specific cycle. For example, a single force reading may be taken instead of taking the average force reading over the time period. Furthermore, a plurality of force readings may be taken over the time interval and any one of the mean, median, mode, and the like utilized from the data set.

During the baling process, the processor 118 continues to receive and calculate data from the sensors 126, 130, and 134 as long as the plunger 26 continues to operate. In particular, the processor 118 compiles work data over the entirety of the stroke of the plunger 26. However, in alternative embodiments, the stroke-work data may be compiled for a portion of the stroke, such as the compression portion of the stroke (i.e., as the plunger 26 moves toward the extended position), or once the plunger 26 has passed beyond a particular position in the baling chamber 82. Once a stroke has been completed, the controller 14 will calculate the $W_{stroke}$ for the previous stroke while beginning to compute work-stroke data for the subsequent stroke. For example, if "n" cycles occur during a single stroke of the plunger 26, the processor 118 will add the first "n" cycles together to determine the amount of work exerted during the first stroke, then add the second "n" cycles together to determine the amount of work exerted during the second stroke. (i.e., $W_{Stroke\ 1} = W_{Cycle\ 1} + W_{Cycle\ 2} + \ldots + W_{Cycle\ n}$ while $W_{Stroke\ 2} = W_{Cycle\ n+1} + W_{Cycle\ n+2} + \ldots + W_{Cycle\ 2n}$). Once calculated, each $W_{stroke}$ may be stored in the controller's memory 122 for future reference.

As the work exerted during each stroke is calculated, the controller 14 may compare the work-stroke calculations to one or more pre-set standards stored in the controller's memory 122. For example, the controller 14 may compare the stroke-work calculation of a single stroke with a maximum work-stroke limit or an "ideal" work-stroke value. Furthermore, the controller 14 may combine or average the work-stroke calculations over a predetermined period of time (e.g., the last 10, 50, or 100 strokes) for comparison with a maximum work-stroke limit or an "ideal" work-stroke value. In still other implementations, the controller 14 may enter past and current work-stroke calculations into a pre-calculated wear model to determine the accumulated wear on the components over the life of the baler 10. In still other implementations, the controller 14 may compare the work-stroke calculations of the baler 10 with that of other balers on the same farm, in a similar region, or operating on similar crops. Generally speaking, single stroke maximums may be used to avoid short-term "overload" damage done on the components of the baler 10 whereas wear models and other aggregated results may be used to better help minimize longer term wear. Still further, the controller 14 may also use a combination of the above.

Still further, the controller 14 may modify the pre-calculated wear models or limits based on past calculations and information. For example, the controller 14 may raise or lower the work-stroke limits based on the passage of time or the number of hours worked. Furthermore, the controller 14 may raise or lower the work-stroke limits based on the temperature of the components or other conditions in the environment. Still further, the controller 14 may adjust the work-stroke limits based on the particular type or condition of the crops being baled (i.e., wet hay; dry hay; wet straw, etc.). In still other implementations, the controller 14 may set work-stroke "goals" based on parameters input by the user; such as desired bale size, desired bale density, and the like. In still other implementations, the controller 14 may consider a combination of the factors indicated above.

Figure 5:
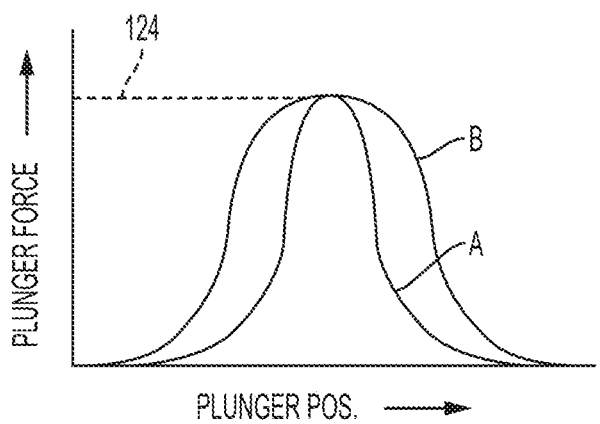
FIG. 5 is chart illustrating various work-stroke profiles.

In still further implementations, the controller 14 may utilize individual work-cycle calculations to create a work-stroke profile (see FIG. 5). The work-stroke profile may, in turn, be utilized by the processor 118 to establish one or more properties of the material being baled. For example, the work-stroke profile may indicate the type of crop being baled (e.g., hay or straw), the condition of the crop being baled (e.g., wet or dry), the attributes of the bale being formed, and the like. Such information can, in turn, be utilized to adjust the wear model limits (as described above), or can be provided to the user directly via a user interface (not shown).

The above described process for calculating the amount of work exerted by the plunger 26 during a particular stroke is advantageous as it permits the system to detect the different work-stroke profiles provided by different operating conditions (i.e., crop type, crop condition, etc.) that may not be otherwise detectable if the system is limited to peak load information. In particular, some crop materials provide a different work-stroke profile even if a similar peak load 124 is achieved. (FIG. 5, crop A profile versus crop B profile).

Finally, after having compared the calculated work-stroke data with one or more pre-calculated wear models or limits, the controller 14 may modify the baling parameters to minimize any wear or damage occurring to the components of the baler 10. In particular, the controller 14 is in operable communication with various aspects of the baler 10 including, but not limited to, the feed system 46, the plunger assembly 90, the bale case 86, the drive tractor (not shown), and the user (not shown). During use, the controller 14 may send instructions, generally in the form of signals, to one or more of these elements to modify the baling parameters and limit or modify the load exerted onto the baler 10. For example, to reduce loads on the plunger 26 and gearbox 18, the controller 14 may signal the bale case 86 to reduce the level of resistance applied to the forming bale 94 or completed bale 32, causing the density of the resulting bale 32 to reduce. In contrast, the controller 14 may signal the bale case 86 to increase the level of resistance applied to the forming bale 94 or completed bale 32, increasing the load on the plunger 26, and increasing the density of the resulting bale 32. Furthermore, the controller 14 may signal the feed system 46 to reduce the feed rate (i.e., the amount of crop material 34 being fed into the baling chamber 82 for a given stroke) to reduce the forces exerted on the plunger 26 for a given stroke. In contrast, the controller 14 may signal the feed system 46 to increase the feed rate to increase the forces exerted on the plunger 26 for a given stroke. Still further, the controller 14 may reduce the travel speed 54 (FIG. 3) of the baler 10 to reduce the amount of crop material 34 being collected by the feed system 46 (which may also have the effect of reducing the feed rate indirectly). The controller 14 may also modify the speed and travel limits of the plunger 26 to modify how and to what extent forces are applied to the compression surface 114. In still other implementations, the controller 14 may signal the user to indicate that overload or high wear conditions exist to allow the user to react accordingly. In still other implementations, such as those where gross overload or damaging wear conditions are detected, the controller 14 may automatically shut-down the baler 10 completely.

Various features of the disclosure are set forth in the following claims.

What is claimed is:

1. A method for reducing wear on a baler, the baler including a baling chamber, a plunger movable with respect to the baling chamber, a first sensor operable to measure force applied to the plunger, a second sensor operable to measure the position of the plunger with respect to the baling chamber, and a controller in operable communication with the first sensor, the second sensor, and the plunger, the method comprising:
   calculating the force applied to the plunger over a predetermined period of time based at least in part on readings from the first sensor;
   calculating the distance the plunger has moved with respect to the baling chamber over the same predetermined period of time based at least in part on readings from the second sensor;
   calculating the work exerted by the plunger based at least in part on the force applied to the plunger and the distance the plunger has moved with respect to the baling chamber; and
   comparing the work calculation with one or more pre-calculated parameters.

2. The method of claim 1, further comprising modifying one or more baling parameters based at least in part on the comparison between the work calculation and the one or more pre-calculated parameters.

3. The method of claim 1, wherein calculating the force applied to the plunger includes taking the average of two or more successive readings from the first sensor.

4. The method of claim 1, wherein calculating the distance the plunger has moved with respect to the baling chamber includes taking the absolute value of the difference of two successive readings from the second sensor.

5. The method of claim 1, wherein comparing the work calculation with one or more pre-calculated parameters includes comparing the work calculation with a maximum work limit.

6. The method of claim 1, further comprising adjusting the pre-calculated parameters based at least in part on prior work calculations.

7. The method of claim 1, further comprising adjusting the pre-calculated parameters based at least in part on the predetermined period of time.

8. The method of claim 2, wherein modifying one or more baling parameters includes adjusting a feed rate of crop material into the baling chamber.

9. A baler comprising:
   a baling chamber;
   a plunger movable with respect to the baling chamber;
   a bale case;
   a forming bale positioned within the baling chamber;
   a first sensor operable to measure the force applied to the plunger;
   a second sensor operable to measure movement of the forming bale with respect to the bale case; and
   a controller in operable communication with the first sensor, the second sensor, and the plunger, the controller configured to:
      calculate the force applied to the plunger over a predetermined period of time based at least in part on readings from the first sensor,
      calculate the distance the forming bale has moved with respect to the baling case over the same predetermined period of time based at least in part on readings from the second sensor,
      calculate the work exerted by the plunger over a predetermined period of time based at least partially based on the force applied to the plunger during the predetermined period of time and the distance the forming bale has moved with respect to the baling case; and compare the work calculation with one or more pre-calculated parameters.

10. The baler of claim 9, wherein the controller is configured to modify one or more baling parameters based at least in part on the comparison between the work calculation and the one or more pre-calculated parameters.

11. The baler of claim 9, wherein the controller is configured to calculate the force applied to the plunger by taking the average of two or more successive readings from the first sensor.

12. The baler of claim 9, wherein the controller is configured to calculate the distance the forming bale has moved with respect to the bale case by taking the absolute value of the difference between two successive readings from the second sensor.

13. The baler of claim 9, wherein the controller is configured to calculate the work calculation with one or more pre-calculated parameters by comparing the work calculation with a maximum work limit.

14. The baler of claim 9, wherein the controller is configured to adjust the pre-calculated parameters based at least in part on prior work calculations.

15. The baler of claim 9, wherein the controller is configured to adjust the pre-calculated parameters based at least in part on the predetermined period of time.

16. The baler of claim 10, wherein the controller is configured to modify the one or more baling parameters by adjusting a level of resistance applied to the forming bale by the bale case.

17. A baler for baling crop material, the baler comprising:
a frame;
one or more wheels rotatably coupled to the frame;
a baling chamber configured to receive crop material;
a plunger at least partially positioned within the baling chamber, the plunger operable to reciprocate between a retracted and extended position;
a controller in operable communication with the feed assembly, the baling chamber, and the plunger, wherein the controller is configured to calculate the work exerted by the plunger based at least in part on the change in position of the plunger within the baling chamber and the force applied to the plunger; and
wherein the controller compares the work calculation with one or more pre-calculated parameters and adjusts the one or more pre-calculated parameters based at least in part on previous work calculations.

18. The baler of claim 17, further comprising a first sensor operable to detect the relative position of the plunger with respect to the baling chamber.

19. The baler of claim 17, further comprising a second sensor operable to detect the force applied to the plunger.

* * * * *